No. 677,147. Patented June 25, 1901.
F. WARBURTON.
MACHINE FOR CUTTING BOOT OR OTHER LACES.
(Application filed Feb. 6, 1900.)
(No Model.) 3 Sheets—Sheet 1.
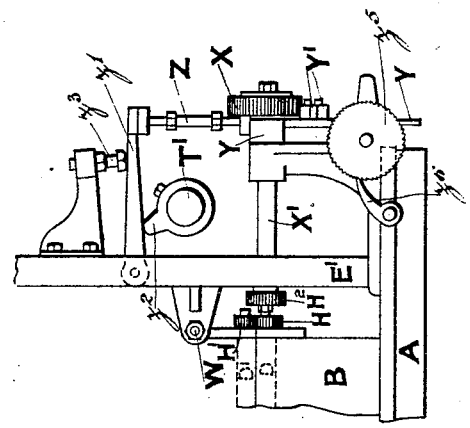
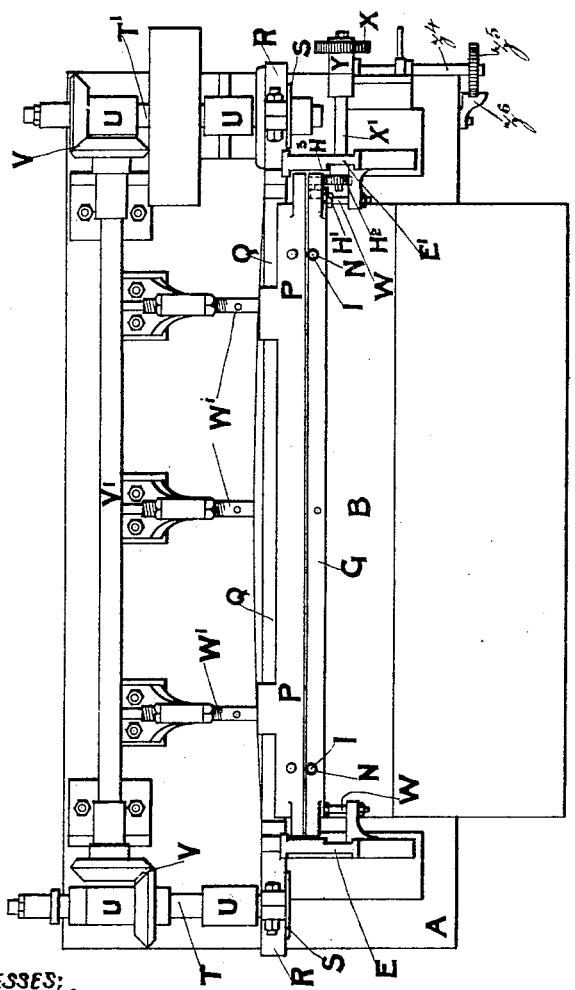
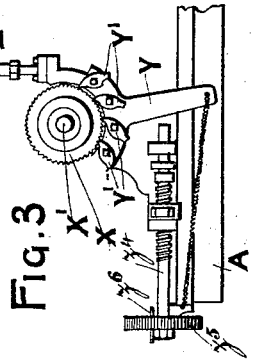
WITNESSES:
Ella L. Giles
[signature]
INVENTOR
Frederick Warburton
BY
[signature]
ATTORNEYS No. 677,147. Patented June 25, 1901.
F. WARBURTON.
MACHINE FOR CUTTING BOOT OR OTHER LACES.
(Application filed Feb. 6, 1900.)
(No Model.) 3 Sheets—Sheet 2.
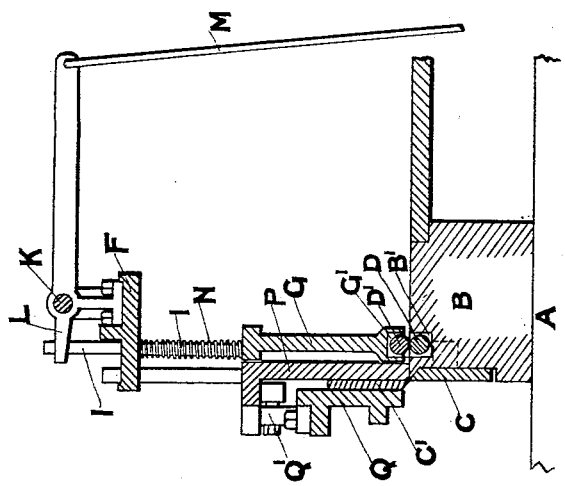
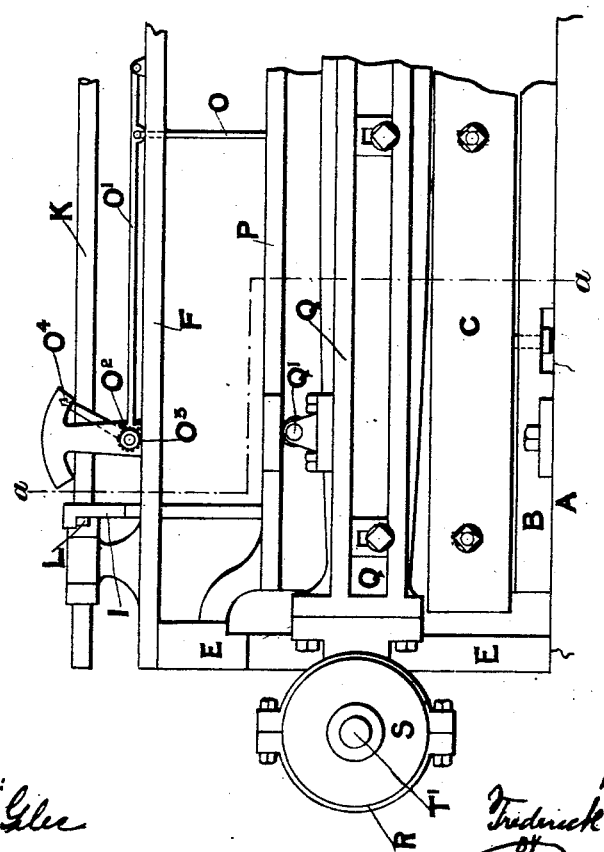

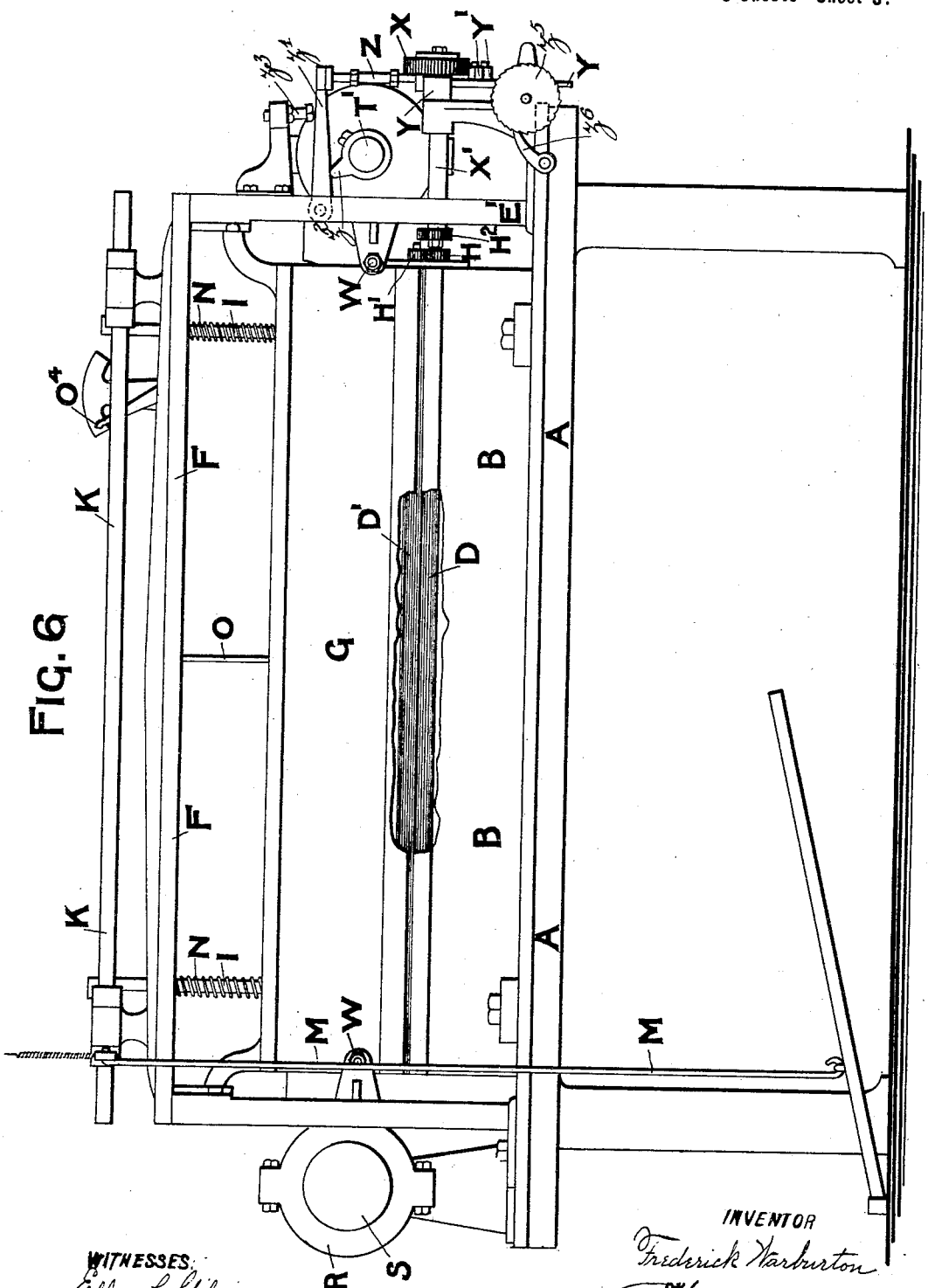

UNITED STATES PATENT OFFICE.

FREDERICK WARBURTON, OF DERBY, ENGLAND.

MACHINE FOR CUTTING BOOT OR OTHER LACES.

SPECIFICATION forming part of Letters Patent No. 677,147, dated June 25, 1901.

Application filed February 6, 1900. Serial No. 4,247. (No model.)

*To all whom it may concern:*

Be it known that I, FREDERICK WARBURTON, a subject of the Queen of Great Britain and Ireland, and a resident of 47 Markeaton street, in the county borough of Derby, England, have invented a certain new and useful Improved Machine for Cutting Boot or other Laces and the Like, (for which I have applied for a patent in Great Britain, said application being numbered 24,075 and dated December 4, 1899,) of which the following is a specification.

The objects of this invention are to expedite the cutting of boot and other laces and the like, to insure the "butts" of leather or other material being cut into strips or "laces" of perfectly even width, and to provide means for varying the said width or gage as desired.

Referring to the drawings which form a part of this specification, Figure 1 is a general plan to a small scale looking down on the machine, with the top plate F and parts above it removed for the sake of convenience in illustrating the parts below. Fig. 2 is a part front elevation to an enlarged scale, showing the feeding apparatus, as will be hereinafter described. Fig. 3 is a part end elevation of the latter. Fig. 4 is a part back elevation of certain parts of the machine to be hereinafter referred to. Fig. 5 is a vertical section on line $a\ a$ of Fig. 4. Fig. 6 is a front elevation, partly broken away. Figs. 2, 3, 4, and 5 are drawn to the same enlarged scale.

In carrying out my said invention I provide a bed A, mounted on suitable standards, (not shown upon the drawings,) and upon the former I mount the parts to be hereinafter described. Upon this bed is fixed a table B, at the back of which is bolted or otherwise secured a vertically-adjustable knife C. Slightly in front of this knife and in suitable bearings in a longitudinal recess B' is placed a milled feed-roller D, the bed, table, feed-roller, and other parts of the machine to be hereinafter described being of a sufficient length to accommodate or take any length of leather butt or other material required.

At or near each end of the bed A, I provide a standard E E', carrying and being connected to each other by means of a top plate F. Upon Fig. 1 this top plate is shown removed for the sake of convenience in illustrating the parts below it. In suitable guides on the inner faces of these standards is arranged a top-roller carrier G. This carrier has a longitudinal groove or recess G' on its under side, in which is held a milled roller D', adapted to engage the bottom feed-roller D (already described as being recessed in the table) by means of pinions H H' at the ends thereof.

The top-roller carrier is provided with suitable lifting-rods I, which pass through the top plate F, already mentioned, and over the latter, mounted in suitable brackets or bearings thereon, is a shaft K, carrying levers L, adapted to operate the lifting-rods, the said shaft and levers being operated from one end by means of a treadle or the like from the rod M. Between the top plate and upper face of the top-roller carrier are arranged springs N, tending to keep the top roller on the bottom one. From the top-roller carrier there passes a rod O, operating, through the means of lever O' and other suitable means, such as rack $O^2$ and pinion $O^3$, an indicator $O^4$, showing what thickness of leather or other material is being fed through the rollers, so that the operator may know how to gage the feed, as will be hereinafter described.

Close by the side of and beyond the top-roller carrier G and working in the same or similar guides is a presser-foot P, which is intermittently lifted by means of a bracket with roller Q' on a beam Q, having eccentric-straps R at each end, in which work eccentric blocks S, carried on or secured to the ends of shafts T T', supported in suitable head-stocks U or bearings bolted to the bed A, one shaft T' being driven direct and the other connected by suitable gearing V and shaft V'. On the front side of the beam Q is bolted or otherwise secured another vertically-adjustable knife C', moving with the said eccentrically-actuated beam Q.

The top-roller carrier G, the presser-foot P, and the knife C', carried by the beam Q, are kept in contact by means of front and back adjusting-brackets W W', respectively.

The feeding apparatus, which is intermittent and adjustable, consists of a ratchet-wheel X on the end of a shaft X', connected with the pinions H H' of the rollers D D' by means of back pinions $H^2$ and $H^3$. On said shaft is a loose lever Y, carrying pawls Y' to engage the ratchet-wheel. This lever is operated through connecting-rod Z and lever $z'$ (the latter being pivoted to the standard E') by means of a cam $z^2$ on the shaft T'. Bracketed to standard E' is an adjustable stop $z^3$ to limit the stroke of lever $z'$. To adjust the feed, I employ a screw-stop $z^4$ to limit the stroke of the lever carrying the pawls. On the end of the said screw-stop is an index-wheel $z^5$, having a pointer $z^6$.

It is evident that without departing from the spirit of my invention I may vary the details to suit individual requirements—such, for example, as by substituting a crank or cranks for the eccentrics or employing a claw feed instead of the roller feed.

Having now described my invention, what I claim as new, and desire to secure by Letters Patent, is—

In combination, the main frame including a bed, a presser-foot having an overhanging flange at the top thereof adjustable knives, a knife-carrier with means for reciprocating the same, a roller carried thereby coacting with the presser-foot, a vertically-movable spring-pressed carrier for one of the rollers, means for lifting the carrier, a pivotal arm carrying a gear, an indicator-pointer having a controlling-pinion meshing with said gear, and a connection from the roller-carrier to said arm, substantially as described.

In witness whereof I have hereunto set my hand in presence of two witnesses.

FREDERICK WARBURTON.

Witnesses:
C. B. SHERWIN,
B. W. BIDWELL.